United States Patent [19]

Mutti et al.

[11] Patent Number: 4,778,372
[45] Date of Patent: Oct. 18, 1988

[54] THERMOPLASTIC WEB CONVEYING MECHANISM AND THERMOFORMING APPARATUS

[75] Inventors: Werner H. Mutti, Buchs; Bruno Covelli, Suhr, both of Switzerland

[73] Assignee: Servichem AG, Zug, Switzerland

[21] Appl. No.: 930,024

[22] Filed: Nov. 7, 1986

Related U.S. Application Data

[63] Continuation of Ser. No. 658,129, Oct. 5, 1984, abandoned.

[30] Foreign Application Priority Data

Oct. 6, 1983 [CH] Switzerland ............ 5451/83

[51] Int. Cl.$^4$ .................................. B29C 51/10
[52] U.S. Cl. ............................... 425/294; 26/97; 226/181; 226/190; 425/174.4; 425/290; 425/291; 425/301; 425/302.1; 425/307; 425/388; 425/397
[58] Field of Search ........ 425/174.4, 235, 290, 425/507, 508, 397, DIG. 201, DIG. 48, 291, 301, 302.1, 307, 388; 264/153, 235.8, 290.2, 292; 226/17, 152, 184, 190, 181, 186, 187; 26/106, 88, 97

[56] References Cited

U.S. PATENT DOCUMENTS

| | | | |
|---|---|---|---|
| 315,809 | 4/1885 | McLean | 26/106 |
| 739,781 | 9/1903 | Green | 26/97 |
| 2,728,941 | 1/1956 | Alles et al. | |
| 3,057,825 | 10/1962 | Tassler | |
| 3,234,310 | 2/1966 | Edwards | 264/93 |
| 3,261,903 | 7/1966 | Carr | 264/290.2 |
| 3,277,224 | 10/1966 | Whiteford | |
| 3,375,313 | 3/1968 | Zygan | 264/290.2 |
| 3,445,886 | 5/1969 | Lemoire et al. | 264/290.2 |
| 3,807,004 | 4/1974 | Anderson | 26/59 |
| 3,837,782 | 9/1974 | Meissner et al. | 425/347 |
| 3,890,421 | 6/1975 | Habozit | 264/289 |
| 3,929,327 | 12/1975 | Oleon | 26/184 |
| 4,087,226 | 5/1978 | Mercer | 425/397 |
| 4,099,902 | 7/1978 | Oberloier | 425/388 |
| 4,289,469 | 9/1981 | Keim | 425/302.1 |
| 4,350,278 | 9/1982 | Roberts | 226/190 |
| 4,442,064 | 4/1984 | Myers et al. | 264/551 |
| 4,477,243 | 10/1984 | Wallstén | 425/292 |

FOREIGN PATENT DOCUMENTS

| | | |
|---|---|---|
| 2161272 | 6/1973 | Fed. Rep. of Germany . |
| 2209932 | 9/1973 | Fed. Rep. of Germany . |
| 2600582 | 7/1977 | Fed. Rep. of Germany . |
| 59-8933 | 5/1978 | Switzerland . |
| 737061 | 9/1955 | United Kingdom .......... 226/184 |

Primary Examiner—James Lowe
Attorney, Agent, or Firm—Burgess, Ryan and Wayne

[57] ABSTRACT

In an apparatus for the production of articles from a planar web of thermoplastic material, having heating, hot shaping and punching devices, a web conveying mechanism for stepwisely transporting the web along the substantially planar path through the apparatus includes a plurality of driven stationary conveying units arranged at opposite edges of the web along the path thereof, each conveying unit including a driving wheel and a cooperating free wheeling supporting roller arranged opposite to each other and having their axes of rotation extending substantially parallel to each other and to the plane of the web, the driving wheel having a wedge-like converging circumference with a toothed circumferential edge and connected to a driving mechanism which synchronously drives the driving wheels, and the free wheeling supporting roller having a cylindrical circumference supporting the web in an adjustable position relative to the driving wheel, such that the toothed circumferential edge partly penetrates the web along a contact line at each side to securely grasp and convey the web in the local conveying direction.

8 Claims, 3 Drawing Sheets

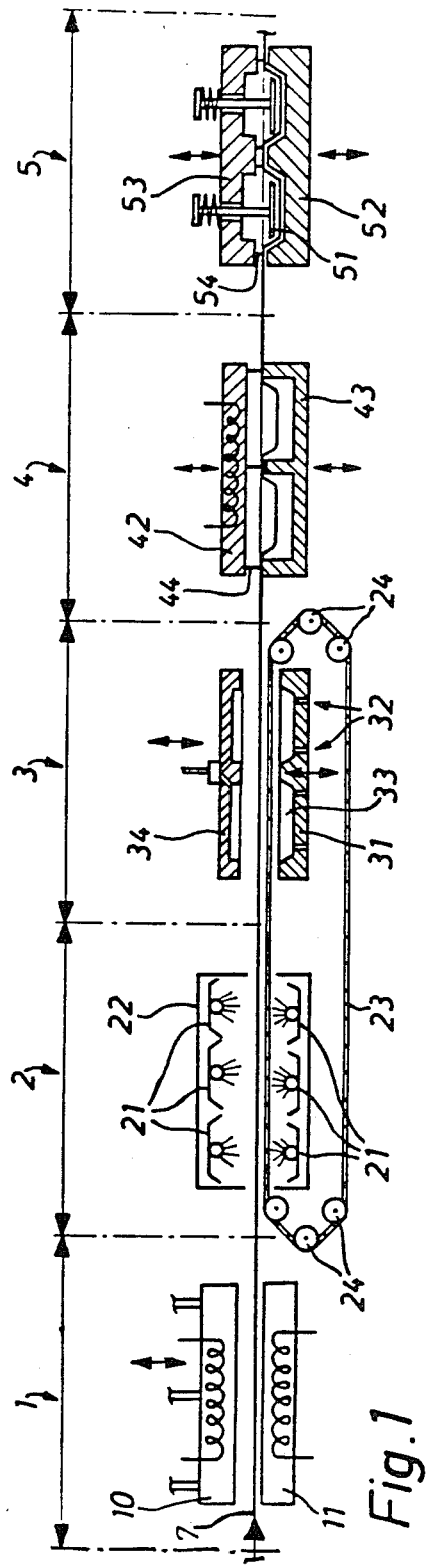
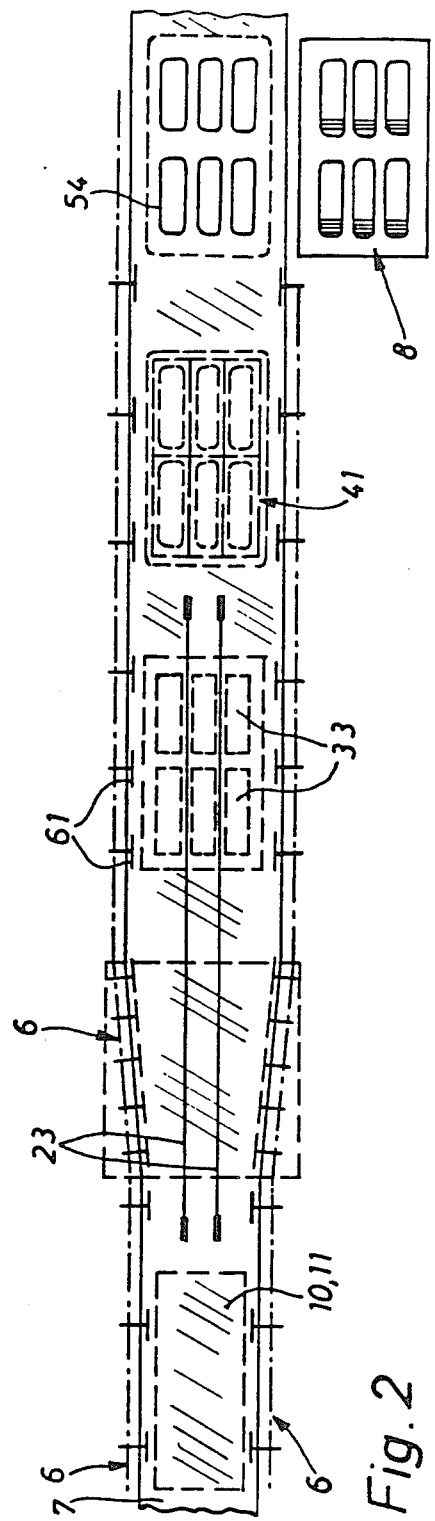
Fig.1
Fig.2

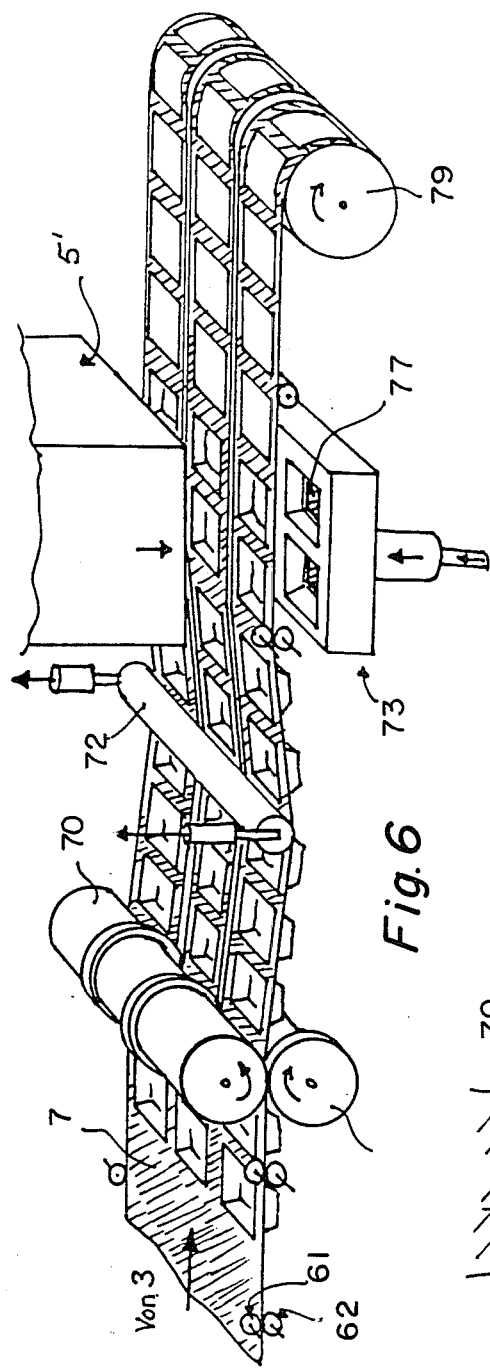
Fig. 6
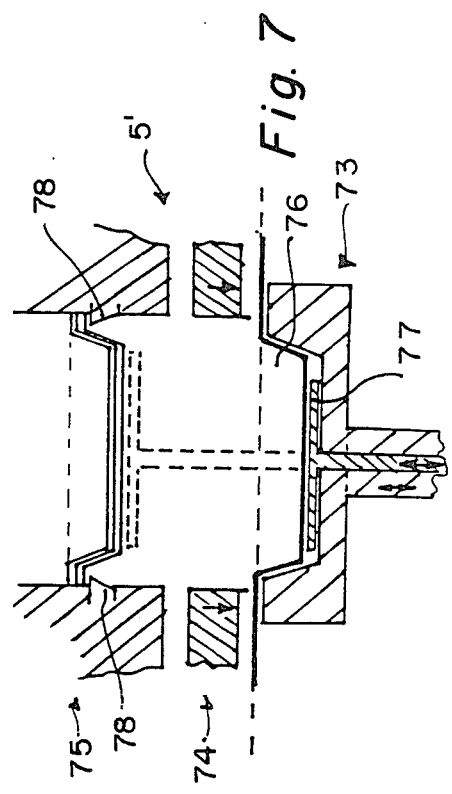
Fig. 7
Fig. 8

THERMOPLASTIC WEB CONVEYING MECHANISM AND THERMOFORMING APPARATUS

This application is a continuation, of application Ser. No. 658,129, filed Oct. 5, 1984, now abandoned.

BACKGROUND OF THE INVENTION

1. Field of the Invention

The present invention relates to an apparatus for the production of articles from a web of a thermoplastic material, having a means for heating the web of a thermoplastic material up to its deformation temperature range, a hot shaping apparatus located downstream of the heating means and operative for the shaping and forming of the articles out of the web of a thermoplastic material, having further a punchihg apparatus operative for severing the shaped articles from the web, and a web conveying mechanism operative for transporting the web through the apparatus.

The invention relates also to a method of producing articles from a multilayer foil of plastic material.

2. Description of the Prior Art

Prior art apparatuses and prior art methods give rise to difficulties, specfically when handling materials having unfavorable thermal behaviors during the heating thereof as well as of the punching of the shaped articles out of the web being handled. Further problems occur at above and other materials regarding the transport of the web through the apparatuses which until now have not found a satisfactory solution.

SUMMARY OF THE INVENTION

An object of the invention is to provide an apparatus, in which the means for heating the web comprises a contact heating apparatus combined with a radiation heating apparatus.

A further object is to provide in the apparatus a conveying mechanism which comprises a plurality of driving wheels located along both sides of the web being transported therethrough, whereby the driving wheels on either side are coupled to a common drive and each driving wheel rests against an associated elastically or non-yieldingly suspended roller, such that the web may be grasped between the driving wheels and the rollers.

Yet a further object is to provide in the apparatus a punching apparatus which comprises a severing device and a centering periphery punching station located downstream of the severing device relative to the direction of web movement, whereby the web is area-wise severed by the severing device around the shaped articles such that the articles can be positioned in a centering device independently from each other and be punched to form their final circumferential shape in the periphery punching station.

Still a further object of the invention is a method of producing shaped articles from a multilayer foil of plastic material comprising the steps of heating the foil by means of a contact heating apparatus comprising a lower heating plate and an upper heating plate, the temperatures of the heating plates and the contact pressure of the plates bearing on the foil being individually adjustable, of heating said foil thereafter by means of a radiation heating apparatus, of shaping and forming the articles out of the plastic foil by means of a hot shaping apparatus, of punching the shaped articles out of the plastic foil by means of a punching apparatus, which foil is transported to the apparatuses by an intermittently operating transporting mechanism.

Still a further object of the invention is to provide a method of producing articles from a multilayer foil of plastic material comprising the steps of heating the foil by means of a contact heating apparatus comprising a lower heating plate and an upper heating plate, the temperatures of the heating plates and the contact pressure of the plates bearing on the foil being individually adjustable, of heating the foil thereafter by means of a radiation heating apparatus, of shaping and forming articles out of the plastic foil by means of a hot shaping apparatus, of punching the articles out of the plastic foil by means of a punching apparatus, of transporting the foil through the apparatuses by an intermittently operating transporting mechanism, and of laterally stretching the foil at least during the step of radiation heating in order to reduce the sag of the foil produced by its transverse extension during the radiation heating thereof.

A further object of the invention is to adjust the temperatures of the heating plates such that during the contact heating step the temperature of the thermoplastic material of the one or more layers of the foil remains below the temperature range of crystalline softening or the temperature range of amorphous-crystalline conversion, respectively, and wherein the temperature induced during the radiation heating step corresponds about to the temperature range of the crystalline softening or the temperature range of amorphous-crystalline conversion.

With regard to the heating of the material web and specifically when handling multilayer foils the foil is brought fast and evenly up to the necessary softened state. Thereby, if different temperatures of softening of the materials of the various layers are present, none of the layers is subjected to an exceedingly high temperature because the quality of the formed articles may suffer considerably due to such overheating. Specifically endangered are nonmetallic barrier-layers of the foil located inside thereof.

The following heating methods and heating apparatuses are known in the prior art: hot air heating, radiation heating as well as contact heating. Hot air heating is time-consuming and correspondingly space consuming and incorporates furthermore a small thermal efficiency; the considerably more efficient radiation heating is detrimental when heating rather large areas in that due to a local air flow between foil and radiator an uneven heating of the foil is produced. The adjusting of radiation heating apparatuses is, furthermore, rather difficult because the heating of the foil depends on its radiation absorption properties, which properties are strongly influenced by the structure of the outer surface thereof and of the particulars of its storage. Conclusively, the temperature profile within the foil is extremely difficult to control when applying such radiation heating.

Finally, the Swiss patent specification CH-PS 598 933 discloses a contact heating of foils. Such contact heating incorporates specifically the problem regarding a clinging of the foil if such foil must be heated to a temperature which is sufficient for a deep-drawing thereof, specifically because the surfaces of the foils attain in an extremely short time the temperature of the heating surfaces of the apparatuses, whereby however the inner areas of the foils will not have yet reached the necessary softening temperature.

According to the invention it has now been found that the mentioned problems can be solved in that the means for heating the web should be a combination of a contact heating apparatus and a radiation heating apparatus. Preferably, the contact heating apparatus is located upstream of the radiation heating apparatus when seen in direction of the transport of the foil through the apparatuses. According to a preferred embodiment the contact heating apparatus comprises a lower and an upper heating plate, which heating plates are movable into contact with the upper and lower, respectively, surface of the material web.

In the contact heating apparatus the foil is given initially a temperature profile which decreases from both outer side surfaces towards the center area thereof. Sensitive, inner barrier layers of a multilayer foil will accordingly be protected against an overheating. The heating proceeds only up to such temperature at which the surface temperatures of the foil allow an impeccable removing thereof from the heating plates. Thereafter, the web portion showing an even temperature across the surface of the web is brought in the radiation heating apparatus up to a softening condition suitable for the shaping, whereby the radiation heating produces basically merely a rising of the already produced temperature profile. Influences of the convection etc. are accordingly much less present because the dwell time of the material in the field of the radiation is considerably shorter in comparison with known radiation heating and accordingly the radiation field may be decreased, too. Such heating means is specifically applied when handling a poly- propylene-multilayer foil having an inner barrier layer of a copolymers of vinylidenchloride-vinylchloride (SARAN), because the barrier layer incorporates a lower softening or melting temperature, respectively, than the outer layer or surface layer, respectively. It is, however, not restricted thereto.

When handling foils of the kind mentioned above which have a detrimental thermic behavior, a further problem is met after the shaping thereof, namely the dimensionally correct punching of the shaped articles. The reason thereto is that the foil which is still at an elevated temperature does not keep as yet its dimensions properly and specifically during the cooling thereof a shrinkage occurs which is extremely difficult to control. In order now to provide in spite of above effects a dimensionally impeccable punching of the material without a dwell time detrimentally influencing the production and necessary for the stabilization of the material the invention provides a punching apparatus which has a presevering station as well as a centered periphery punching station located downstream of the pre-severing station such that the articles formed out of the web of the material are severed from each other in the pre-severing station at least area-wise and thereafter, upon the exact fitting into a centering-device in the peripheral-punching station will be punched to the final circumferential shape. The pre-severing during which an exact maintaining of the dimensions is not necessary allows that the individual articles can be positioned into the centering device independently from each other such that an individual positioning is achieved independent from a possible irregular dimensional shrinking of the web. The accordingly exactly positioned articles can be then given their exact circumferential shape by means of a punching knife or punching edge, respectively, adjusted exactly on the centering device.

Furthermore, when handling webs of materials a problem arises regarding the transport and the conveying of such webs through a complete handling apparatus. Such problems are encountered specifically when the foil stretches laterally during the heating thereof, which may be worsened, for instance in the area of a radiation heating apparatus due to the own gravity weight of the foil. If now in such situations a sag of the foil is to be prevented or at least reduced, a small lateral component of the transporting forces is applied at least at certain areas. Known transporting and conveying apparatuses operate with clamping chains or chains provided with spikes located at either side of the web, which chains engage the web along the complete length thereof at its rim areas. The drawback of such chain structures is that they produce an uneven stretching. At intermittently operating producing operations the maintaining of exact dimensions of the individual steps is quite difficult and differing advances at the two sides of a web can lead to detrimental diagonal stretchings of the web shaped foil. Because chains can run along or within, respectively, one plane only it is extremely difficult to produce with such chain mechanisms a local and areawise lateral stretching of the foil.

The conveying mechanism according to the invention solves above problem in that it comprises a plurality of driving wheels located along both sides of the web, the driving wheels on either side coupled to a common drive, each driving wheel resting against an associated elastically or non-yieldingly suspended roller, whereby the web may be grasped between the driving wheels and the rollers. Preferably, the driving wheels comprise a tooth periphery. Each roller bears preferably against its associated driving wheel under an adjustable load, and the web engaging area of each driving wheel is preferably dimensioned such that it penetrates into said web to produce a line engagement. Within the area, within which a lateral stretching of the foil shall be produced, the driving wheels can be oriented section-wise at an angle relative to the web transport direction. Such driving mechanism allows an exactly maintainable length of individual feeding steps also at an intermittent driving operation.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 1 illustrates a schematic side view of an apparatus for the production of articles from a thermoplastic foil showing some stations in section along the direction of movement of the web;

FIG. 2 is a schematical top view of the apparatus illustrated in FIG. 1;

FIG. 3 is a part of a transporting mechanism in the view laterally to the direction of movement through the apparatus and at the plane of the foil fed therethrough; through;

FIG. 6 is a schematic perspective view of a part of the apparatus illustrating specifically schematically the pre-punching of the shaped articles in the web;

FIG. 7 is a schematical section of a circumferential punching station illustrated in FIG. 6; and FIG. 8 is a view of a section of the cutting rollers of the pre-punching or pre-cutting, respectively, station illustrated in FIG. 6.

DESCRIPTION OF THE PREFERRED EMBODIMENTS

Figure 5:
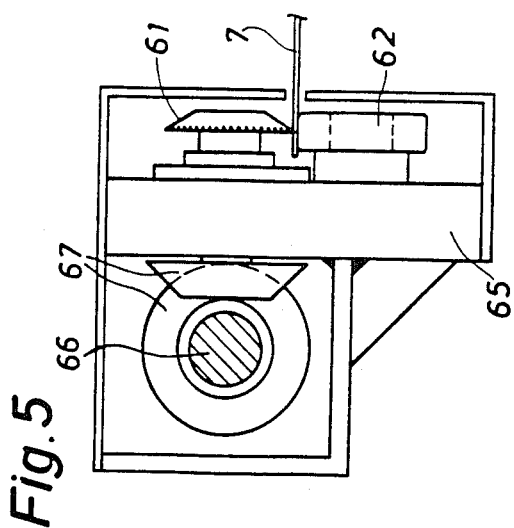
FIG. 5 is a schematic view of a section along the driving axis of the driving mechanism.

The illustrated apparatus which will be described initially with reference to the first two figures only comprises basically five processing stations 1 to 5 arranged in mutual succession. The heating means, punching means and transporting means are shown in a certain combination. According to the preceding explanations and also further following explanations any of the illustrated stations, i.e. the apparatuses installed thereof, can be operated without the other stations. Considering now specifically FIGS. 1 and 2 a roll suspending structure is shown at the infeed side of the apparatus, i.e. at the left-hand side of FIGS. 1 and 2, which suspension structure is of a known design and, therefore, not specifically shown. It may be dimensioned, for instance, for a width of rolls of materials of 560 millimeters and a roll diameter of 1200 millimeters. Because the transport of the material, of the web through the entire apparatus proceeds in a stepwise manner, a compensating station is located after the roll suspension structure such that it is possible to store at any time a length section of the web corresponding to the length of the individual steps. Due to this arrangement the drawing off speed from the roll can remain practically continuous whereby the reeling off speed can be adjusted to the respective diameter of the roll by means of light barriers. Thereafter the conveying mechanism 6 located at both sides of the material web engages into the web and transports and conveys the web stepwise through the entire apparatus. The first operating station is a contact heating apparatus 1 including two heated plates 10 and 11, whereby the foil or web 7, respectively, may be clamped therebetween. The electrical heating of the plates can be adjusted individually for each plate to an adjustable set value. The two plates 10, 11 can clamp intermittently the foil 7 therebetween by exerting an adjustable contact pressure and release the foil thereafter. To this end at least one of the plates, in the illustrated embodiment the upper plate 10 comprises a corresponding hydraulic or pneumatic mechanism. The temperature as well as the contact pressure of the plates are adjusted such that during the projected duration of individual steps, for instance 4 seconds, the heating of the material is completed in accordance with the data necessary for a respective given material. In case of multilayer foils having temperature sensitive barrier layers located within such foils the mentioned data are adjusted such that the sought temperature profile within the foil is produced. During the contact heating of the foil its complete surface being worked upon is uniformly heated essentially across its complete extent, however not heated up to the temperature point of the softening thereof. Accordingly, it is not possible that the foil will cling to the plates 10, 11. Immediately following the contact heating apparatus 1 the web enters during the next following working step the radiation heating apparatus 2. This apparatus comprises radiators 21 emitting rays of medium frequency and located at both sides of the foil 7 fed therethrough, which radiators 21 are located in a casing such to decrease the air convection. Within the duration of the feeding steps chosen the final heating of the foil up to its temperature of the softening thereof can now be carried out. In this area a lateral stretching of the foil will occur, which lateral stretching is increased further by influence of the gravity weight of the foil and can lead to such a sag which changes the distances from the foil to the respective radiators. In order now to reduce or even eliminate such sag, two measures can be taken: The one measure encompasses a supporting of the foil in its central area by means of at least one supporting member running along with the foil. In the apparatus illustrated two cables 23 which run along with the foil are provided, which cables are guided over guide rollers and drive rollers 24 ahead of the radiation heating apparatus and are located immediately below the foil and support the foil until the corresponding area thereof enters into the shaping station 3. Furthermore, the transporting mechanism may produce a local lateral stretching of the foil in the general area of the radiation heating apparatus 2 such as will be described further below in detail. The two-step heating described secures specifically in case of multilayer foils an optimal heating thereof. The contact heating induces in the foil in an extremely short time and in an energy-saving manner a temperature profile and the radiation heating heats the stable covering foils without injuring the foils (barrier foils) located within the web up to the ideal and correct temperature of the softening thereof. Such heating arrangement has been proven specifically advantageous in case of working with a multilayer foil which has a barrier layer of "SARAN" (a copolymer of vinylidenchloride-vinylchloride) which barrier foil is adhered to the outer foils of polypropylene by means of an adhesive agent or an adhering means whereby the total thickness of the foil amounts to about 900 μm, whereby such multilayer foil is used to produce container bodies. However, also other barrier-polymers, such as EVOH, can be used for such applications.

The shaping can proceed in a manner known as such in a following hot shaping apparatus 3. Such hot shaping apparatus 3 is designed such that it can operate according to the positive method as well as the negative method based on a vacuum shaping operation or also on a pressurized air shaping operation. The punching device can be directly integrated into the hot shaping device or such as illustrated in the preferred embodiment described the punching out can be carried out during one or the further following operation steps. An (not particularly shown) elbow lever mechanism allows the opening and the closing of the mold forms.

The hot shaping apparatus illustrated in FIG. 1 is designed for a pressurized air shaping. Recesses 33 allowing a simultaneous shaping of six container bodies are provided in a lower negative form 31 which includes air exit channels 32. Channels for the cables 23 are located between the recesses 33. By means of an upper plate 34 the individual recesses can be closed in an air-tight manner and thereafter the container bodies are shaped by means of pressurized air.

In the embodiment described which relates to the earlier mentioned multilayer foil which is thermally difficult to handle the punching apparatus is arranged separately from the hot forming apparatus such that the foil may cool down sufficiently prior to the punching out of the articles because otherwise the barrier foil which would be still extremely soft could cling to the punching tool and begin to get stringy. The punching apparatus is designed such that in spite of the irregular shrinking of the foil during the cooling thereof after the hot shaping of each article, i.e. each container body, can be given still the same exactly defined circumferential shape. To this end the web of material is severed between the shaped containers area-wise such that the container bodies still carried by the web can be positioned independently from each other in the proper periphery punching station. To this end and in accordance with a first embodiment illustrated in FIGS. 1 and 2 there is provided a pre-punching station 4 and a periphery punching station 5 following the pre-punching station 4.

The pre-punching station 4 can be utilized simultaneously for producing the final circumferential or peripheral, respectively, punching in case the foil being handled allows such operation. In case of foils having a high shrinkage the pre-punching station 4 serves merely for a pre-punching thereof by leaving predetermined breaking lines 41 between the individual container parts or in the material web, respectively, at the corresponding places. This pre-punching station 4 comprises an upper punching tool 42 and a lower punching tool 43, which both can be drawn back and away from the web. A cutting edge 44 is inserted into the upper punching tool 42 which may be heated, which cutting edge 44 is dimensioned in accordance with the intended pre-punching and which operates against corresponding surfaces provided at the lower punching tool 43. After such pre-punching the pre-shaped container parts still interconnected at the predetermined breaking lines 41 with the material web reach during the next following operation step the periphery punching station 5. Along the path to this periphery punching station the foil has cooled to such an extent that a shrinkage of its dimensions may have happened. In order to achieve an impeccable peripheral punching the container parts are broken initially by operation of the breaking punch 51 out of the foil or web 7, respectively, and urged at the same time into a lower centering member 52. Immediately following the centering the periphery punching is carried out by means of a knife 54 located at an upper punching tool 53, which knife 54 corresponds to the exact periphery of the respective container parts. Thereafter, the container parts, i.e. container bodies, are led away in an upwards direction by means of commonly known procedures which are not particularly shown and stacked in a stacking station 8. The rest of the material of the web is rolled up thereafter at the exit of the apparatus (not specifically shown).

In FIGS. 6 to 8 a second embodiment is illustrated which shows a further variation of the punching out of the containers following the hot shaping apparatus 3. Initially, the web of material 7 including the container bodies already shaped therein is severed by means of cutting rollers 70, 71 at areas extending between the longitudinal rows of containers into individual web stretches such that seen in lateral direction of the transporting mechanism each single web part is shiftable independently from the adjoining web parts to achieve a lateral positioning of the container bodies during the next following periphery punching in the periphery punching station 5. The cutting rollers 70, 71 are profiled such (FIG. 8) that during the severing a narrow strip is cut out of the material web. A roller 72 is arranged downstream of the cutting rollers 70, 71, which urges the now cut webs out of the plane they had occupied previously. Prior to the positioning of the container bodies in the periphery punching station 5' this roller 72 is raised. The length of the web which is gained therewith is large enough that a sufficient tolerance in the longitudinal direction of the web for an impeccable positioning of the container bodies is achieved. The periphery punching station 5' illustrated in FIG. 7 is designed for one container only and a view of a section thereof is shown schematically only. It comprises a positioning and ejecting member 73 located under the web of material, comprises further a punching member 74 located thereabove as well as a magazine 75 for the finally punched container bodies. During the transporting phase of the web 7 the positioning and ejecting member 73 as well as the punching member 75 remain lifted off the web. For the punching operation initially the positioning and ejecting member 73 is lifted from below against the container bodies, which due to the moving tolerance present in lateral direction as well as in longitudinal direction can adjust themselves exactly to be positioned inside of the corresponding recesses 76. Thereafter the peripheral punching is carried out by lowering the punching member 74 onto the web portions. The container bodies punched out are moved thereafter by means of an ejecting member 77 through the punching member 74 and upwards into the magazine 75 located thereabove and guided therein from below onto the respective container body stack, which stack is supported and held inside the magazine 75 by means of projections 78. After retreating of the ejecting member 77 the operation step is terminated. The rest of the material of the web is thereafter wound onto a roll 79.

The described and illustrated punching methods can be utilized independently from the particular design of the preceding heating means and heating apparatuses for producing a dimensionally exact punching of hot shaped articles which change their dimensions when cooling down in that by means of a centering these inconvenient and hardly controllable effects can be eliminated.

Figure 3:
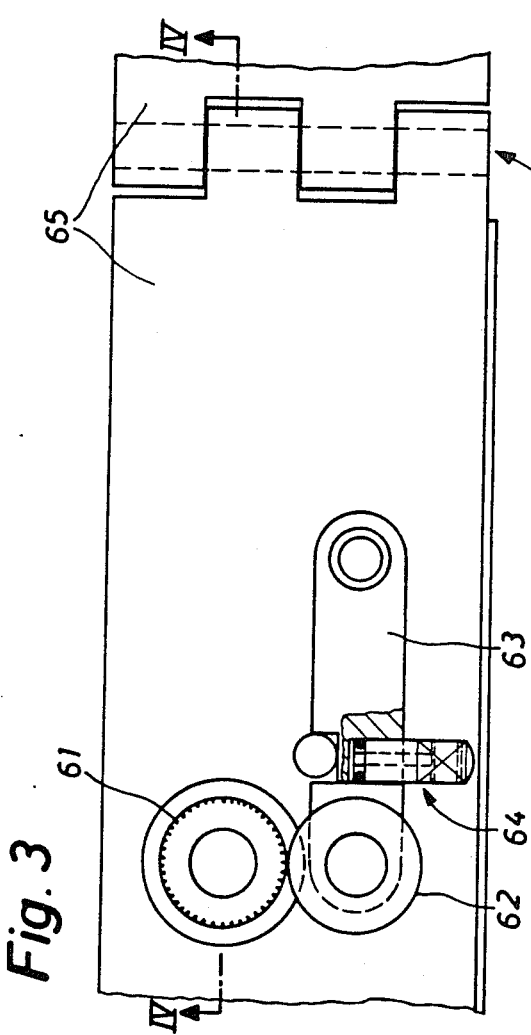
Figure 4:
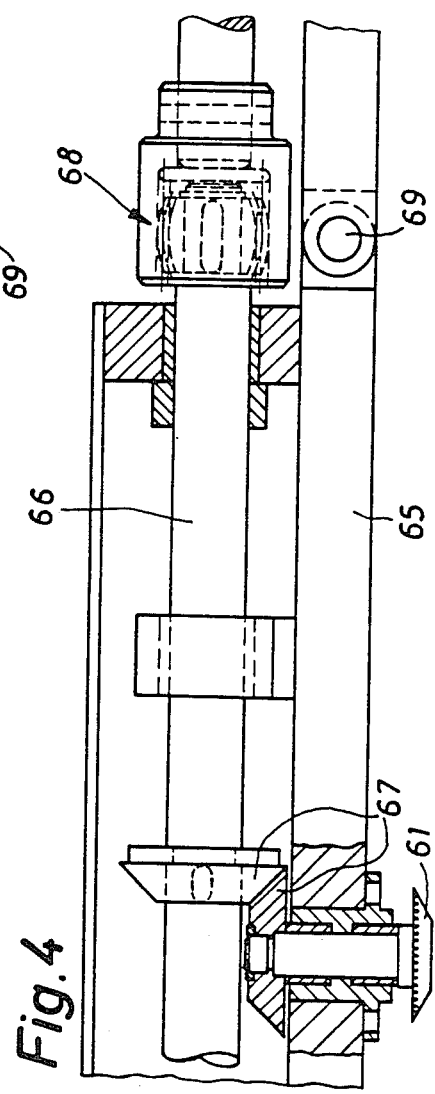
FIG. 4 is a view of a section along the line IV–IV of FIG. 3.

The conveying or transporting, respectively, of the material web through the apparatus is achieved by means of a conveying mechanism 6 which is illustrated in detail in FIGS. 3 to 5. Such as schematically shown in FIG. 2 the conveying mechanism 6 extends at either side of the web and along the entire apparatus and engages into the edge of the web at an area outside of the shaping area thereof. In case, for instance, of a width of the web of about 560 millimeters and a shaping area of a width of about 525 millimeters the width of the edge of the web for the transport of the present embodiment amounts to about 17 millimeters. The conveying mechanism 6 comprises driving wheels 61 distributed along the apparatus and each driving wheel 61 is supported against the corresponding supporting roller 62. The web 7 is grasped between the driving wheels and the supporting rollers such as clearly illustrated in FIG. 5. Each supporting roller 62 is loaded by means of an adjustable force and urged accordingly against its driving wheel 61. This can be achieved such as shown in FIG. 3, in that the supporting roller 62 is suspended on a rocking lever 63, onto which a force is acting which is generated by a pneumatic cylinder-piston mechanism 64. Preferably, the supporting rollers 62 are provided with frictionless bearings, i.e. ball bearings, such that a minimal resistance against the transporting of the web is generated. At their wedge-like converging circumference the driving wheels 61 comprise finely dimensioned teeth such that the friction against the foil is increased. The area of engagement along the periphery is chosen in relation to the loading exerted by the supporting roller 62 such that the driving wheels penetrate partly into the material web such that a line-shaped engagement is produced. This is quite important for achieving a defined direction of transport, specifically in those areas in which the transport must proceed such that a lateral component is present, in case of the apparatus described in the area of the radiation heating 2. The wedge-like design of the area of engagement of the driving wheels prevents moreover the web of material to slide out during the various operation steps, during which lateral forces may be produced in the material web. The drive of the driving wheels is a fixed drive and is achieved via a driving shaft 66 each and two bevel gears 67. This fixed drive secures an exact maintaining of the chosen longitudinal dimension of the individual steps and necessitates only small maintenance. The conveying apparatus is mounted in a supporting member 65 which is mounted in turn to a frame of the apparatus (not particularly shown).

In order now to produce a lateral transporting component in certain areas, for instance in order to compensate an unwanted sag, such as present in the apparatus described or in order to stretch the web laterally, the supporting member 65 can be provided on the corresponding locations with a hinge-joint 69 and the driving shaft 66 can be accordingly provided with a jaw clutch coupling 68 acting as universal joint. In the embodied apparatus described herein such hinge-joints and universal couplings are provided prior to the radiation heating apparatus 2 and after the radiation heating apparatus 2 seen in direction of transport of the web therethrough, such that in this area the driving wheels 61 can be arranged such that they are located at an angle relative to the direction of web transport producing a corresponding lateral transporting or conveying, respectively. It is to be mentioned that this conveying mechanism 6 may be used not only together with the above described parts and sections of the apparatus, this conveying mechanism 6 can find general use for the transport of webs.

In combination with the illustrated apparatus this conveying mechanism produces specific advantages in that it allows a maintaining of exact dimensional feeding steps during the intermittent feeding and allows the equalizing of a sag which is produced in the general area of the radiation heating apparatus.

It has been mentioned above that the apparatus described herein is specifically suitable for producing articles out of a web of material of a thermoplastic foil and specifically for handling multilayer foils having temperature-sensitive inner layers. Such a foil is for instance a laminate having a thickness of 900 μm made of covering foils of polypropylene which adhere to a layer of "SARAN" located within the foil by means of a adhesive means. Such relatively thick multilayer foils which are particularly suitable for the production of containers for foodstuffs having excellent barrier properties could be used hitherto due to the quite difficult thermal behavior of the foil only with large difficulties. The present invention allows such now in an impeccable manner, which is specifically due to the double-step arrangement of the heating apparatuses and punching apparatuses.

While there are shown and described present preferred embodiments of the invention, it is to be distinctly understood that the invention is not limited thereto, but may be otherwise variously embodied and practiced within the scope of the following claims.

We claim:

1. In an apparatus for the production of articles from a planar web of a thermoplastic material, having a means for heating said web of a thermoplastic material up to its deformation temperature range, a hot shaping apparatus located downstream of said heating means and operative for the shaping and forming of said articles from said web of a thermoplastic material, a punching apparatus for severing the shaped articles from said web, and a web conveying mechanism for stepwisely transporting said web along a substantially planar path through the apparatus, said path having linear transport sections in which the edges of the web are conveyed in parallel to a longitudinal axis and at least one diverging transport section in which the edges of the web are conveyed in directions diverging at an angle to said longitudinal axis, said web conveying mechanism having a plurality of driven stationary conveying units arranged at either edge area of said web along said substantially planar path thereof, the improvement comprising: each of said conveying units including a driving wheel and a cooperating freewheeling supporting roller arranged opposite to each other and having their axes of rotation extending substantially parallel to each other and substantially parallel to the plane of the web, said driving wheel having a wedge-like converging circumference with a toothed circumferential edge and being connected to a driving mechanism for synchronously driving the driving the driving wheels, and said freewheeling supporting roller having a cylindrical circumference supporting the web in an adjustable position relative to said driving wheel, in which position said toothed circumferential edge partly penetrates the web from one side along a contact line defining a local conveying direction at each unit, said driving wheels being mounted along the edges of said web with their contact lines to the web in parallel to said longitudinal axis in said linear transport sections and at said angle to said longitudinal axis in said diverging transport section, wherein all said driving wheels are synchronously driven by means of a driving mechanism comprising driving shafts for drivingly connecting all driving wheels located along one edge of said web.

2. The apparatus of claim 1, wherein said conveying units are mounted on longitudinal supporting members, extending on either side along said substantially planar path, said driving mechanism comprising driving shafts extending in parallel to said supporting members and gears located at each conveying unit by which each shaft is connected to a respective conveying unit.

3. The apparatus of claim 2, wherein each of said longitudinal supporting members is comprised of several supporting member sections, and wherein each of said driving shafts includes several corresponding driving shaft sections, said supporting member sections and said driving shaft sections being connected by hinge joints, at least the sections located beside said heating means being oriented together with the respective driving units at an angle relative to a web transport direction in order to produce an outwardly directed lateral transporting component.

4. An apparatus for the production of articles from a web of a thermoplastic material, having a means for heating said web of a thermoplastic material up to its deformation temperature range, a hot shaping apparatus located downstream of said heating means for the shaping and forming of said articles in a plurality of longitudinal, laterally spaced rows from said web of a thermoplastic material, a web conveying mechanism operative for transporting said web along a substantially planar path through the apparatus and further a punching apparatus for severing the shaped articles from said web, said path having linear transport secitons in which the edges of the web are conveyed in parallel to a longitudinal axis and at least one diverging transport section in which the edges of the web are conveyed in directions diverging at an angle to said longitudinal axis, said conveying mechanism comprising driven conveying units arranged at either edge area of the web wherein each of said conveying units includes a driving wheel having a wedge-like converging circumfernece with a toothed circumferential edge and a cooperating freewheeling supporting roller with a cylindrical circumference, said driving wheels being mounted along the edges of said web with their contact lines to the web in parallel to said longitudinal axis in said linear transport sections and at said angle to said longitudinal axis in said diverging transport section, wherein all said driving wheels are synchronously driven by means of a driving mechanism comprising driving shafts for drivingly connecting all driving wheels located along one edge of said web, said conveying units being arranged inside said heating means and said hot shaping apparatus, and said punching apparatus comprising a severing device and a centering periphery punching station located downstream of said severing device relative to the direction of web movement, said severing device comprising cutting roller means for longitudinally separating said web between adjacent rows of shaped articles into longitudinal web sections, each of which comprises only one row of articles, so that in said centering periphery punching station said web sections are adjustable in their lateral position independently of each other, said apparatus further comprising a roller arranged between said cutting means and said centering periphery punching station for intermittently urging said web sections out of a plane defined by said path of the web through the apparatus and releasing the same prior to an operation of said centering periphery punching station to gain a tolerance also in a longitudinal direction of the web in said punching station.

5. The apparatus of claim 4, wherein downstream of said centering punching station a roll is provided for taking up said continuous longitudinal sections of said web after removing said articles from said web.

6. The apparatus of claim 4, wherein said cutting means comprises two cutting rollers arranged on opposite sides of the web and profiled for severing a narrow longitudinal strip of web material between said longitudinal rows of shaped articles.

7. The apparatus of claim 4, wherein said centering periphery punching station, comprising a positioning member having recesses corresponding to an outer shape of said articles and located under the web and liftable from below against said articles to receive the same in said recesses said articles thereby adjusting themselves in lateral and longitudinal direction and further comprising a punching member located above the web for peripherally punching out said positioned articles from said longitudinal web sections.

8. In an apparatus for the production of articles from a planar web of a thermoplastic material, having a means for heating said web of a thermoplastic material up to its deformation temperature range, a hot shaping apparatus located downstream of said heating means and operative for the shaping and forming of said articles from said web of a thermoplastic material, a punching apparatus for severing the shaped articles from said web, and a web conveying mechanism for stepwisely transporting said web along a substantially planar path through the apparatus, said path having linear transport sections in which the edges of the web are conveyed in parallel to a longitudinal axis and at least one diverging transport section in which the edges of the web are conveyed in directions diverging at an angle to said longitudinal axis, said web conveying mechanism having a plurality of driven stationary conveying units arranged at either edge area of said web along said substantially planar path thereof, the improvement comprising: each of said conveying units including a driving wheel and a cooperating freewheeling supporting roller arranged opposite to each other and having their axes of rotation extending substantially parallel to each other and substantially parallel to the plane of the web, said driving wheel having a wedge-like converging circumference with a toothed circumferential edge and being connected to a driving mechanism for synchronously driving the driving wheels, and said freewheeling supporting roller having a cylindrical circumference supporting the web in an adjustable position relative to said driving wheel, in which position said toothed circumferential edge partly penetrates the web from one side along a contact line defining a local conveying direction at each unit wherein said conveying units operate to transport said web in said local conveying direction and to assert a lateral force on said web substantially transverse to said local conveying direction to at least compensate for unwanted sag in said web said driving wheels being mounted along the edges of said web with their contact lines to the web in parallel to said longitudinal axis in said linear transport sections and at said angle to said longitudinal axis in said diverging transport section, wherein all said driving wheels are synchronously driven by means of a driving mechanism comprising driving shafts for drivingly connecting all driving wheels located along one edge of said web.

* * * * *